(12) United States Patent
Adams

(10) Patent No.: X6178
(45) Date of Patent: Oct. 4, 1830

(54) PRINTING PRESS, POWER

(76) Inventor: Isaac Adams

* Isaac Adams of Boston Massachusetts

Letters Patent. Reissued April 20th 1858.

The Schedule referred to in these Letters Patent and making part of the same containing a description in the words of the said Isaac Adams himself of his improvement in the Printing machine Called a Power Printing Press To all persons to whom these presents shall come, Isaac Adams of the City of Boston in the County of Suffolk and State of Massachusetts machinist sends Greeting. Be it Known that I the said Isaac Adams have invented constructed made and applied to use sundry new and useful improvements in a printing machine called a Power Printing Press specified in the words following viz. The frame of the machine is 9 feet long 3 feet wide and 3 feet 2 inches high. The top rails which run lengthwise of the frame, are 9 inches deep and 3 inches thick. The two posts at one end of the frame are one foot wide 3 inches thick and as high as the top of the top rails. The ends of which are tenoned into the edges of the posts. the posts or legs at the other end of the frame are 5 inches wide. and 3 inches thick and are tenoned into the under edges of the rails 4 inches from their ends. The two posts on each side are connected to each other lengthwise of the frame by rails. the dimensions of which are the same in width & thickness as the small posts. These rails are tenoned into the posts 7 inches from their bottom ends. The two sides of the frame are connected together by 3 cross bars between the two large posts and 2 at the other end of the frame. The lower bar between the two large posts is 4 inches deep and one foot wide and is tenoned into the posts 3 inches from their bottom ends. The 2nd bar is of the same dimensions as the bottom one and is tenoned into the posts 16 1/2 inches above it. The top bar which is 2 inches deep is tenoned into the posts 2 inches below the top of the frame. The cross bars at the other end of the frame are 4 inches square, and the bottom one is tenoned into the legs, 7 inches from their bottom ends, and the top one in to the top rails. 5 inches below the top of the frame. The bed which the form is laid on is a plate of cast iron having a number of bars running lengthwise and cross wise, on its under side to [illegible] it from [illegible] when the impression is given. The

* Extended for seven years from 4th October 1844.

Extended by act of Congress until the Second day of March 1864 (see vol (1) 280 of Extensions)

bed iz 2 1/2 feet long and 2 feet wide, and iz placed in a horizontal position
betwixt the 2 top Rails 4 feet from the end of the frame, with the large posts
and iz kept steady in rising and falling (which it iz made to do every im-
pression) by a guide at each end of the bed which runz in groovez on
the inside of the top Railz. The guidez are small ribz on piecez of cast
iron which are fastened to the ends of the bed and run down far enough
below the bed to rest on the lower railz of the frame when the top side of
the bed iz 5 1/2 inchez below the top of the frame, a bar of cast iron iz then
placed across the frame and directly under the centre of the bed to sustain
the impression. This bar iz 8 inchez deep in the middle 6 inches deep at
the endz and 2 inches thick and iz made in a scrolled form, so that when
the endz come up against the under side of the lower railz, a straight
place in the middle and on the top edge of the bar will be az low az the
bottom endz of the postz (when the machine iz set up there must be a place
cut in the floor to receive this bar) There iz also a hole thro' each end
of this bar which receives boltz 2 inches in diameter, that pass up
thro projections on the lower endz of the before named guidez close to the -
sidez of the frame and 8 inchez above its top. The boltz have headz on
their bottom endz, and nutz on their top endz which go on the boltz with
a square threaded screw. The Platten iz like the bed except that it iz
4 inchez narrower and 4 inchez shorter, and haz a projection at each cor-
ner by which the Platten iz suspended on ribz placed on the top railz to
slide it off or on when the form iz put on the bed and 2 other projections on
the endz strong enough to sustain the impression, with slitz or aperturez
in their sidez (next to the end of the frame which haz the large postz)
to receive the boltz. The bed iz raised and the impression given by means
of leverz called togle joints which are operated by a crank and pitman
The togle jointz are applied betwixt the bed and the iron cross bar before
named, and the crank iz hung to the 2 lower cross barz in the end of the
frame. The pitman iz connected to the crank with a flat staple or strap
of iron which goez round one side of the neck of the crank and
receives the end of the pitman betwixt the two endz where it iz held by a pin
passed through the 2 endz of the staple and the end of the pitman. Betweat the end of the pitman and the neck of the crank there is a block of iron which is so formed as to fit on to the neck of the crank and on to the end of the pitman which is also rounded so as to form a joint on the end of the pitman corresponding with the pin which holds them together in order that the other end of the pitman may be moved up and down which it is constantly doing when in operation On account of its being necessary to raise and lower the bed with one half of the revolution of the crank: it is made eccentric 8 inches which gives 16 inches motion to the pitman in the direction of the length of the frame, this is nearly twice as much as is necessary to move the togle joint therefore 10 inches of the pitman is made one inch narrower than the other part. which leaves a projection on its under edge so that when the pitman has received one half of its motion towards the bed, the projection strikes an apparatus (hereafter described) and carries the togle joints up until the 2 levers which compose them become nearly perpendicular. then the pitman is drawn back by the crank and the heft of the bed springs the togle joints and the 2 ends which operate against each other - follow the pitman until the bed falls to its place of rest when the projection on the pitman leaves its bearing until the crank has passed the other half of its revolution. The narrow part of the pitman sliding thro a slit made in the upper lever for that purpose, and on a pin which goes through the middle joint. Here it may be observed that the togle joints are least powerful when they first begin to operate and that the pitman is moving fastest towards them at that time; and fastest from them when they stop, consequently (if there was nothing to prevent it) the pitman would strike so hard and the bed would stop so sudden that it would cause the machine to shake and make considerable noise. For these reasons I have put the apparatus before named (which I shall call the declension lever) on the lower lever of the togle joints for the pitman to strike against. The name of the lever signifies its property or nature, for it is almost infinitely powerful when it begins to operate and decreases to nothing. It is made 7 inches long 2 inches wide, one inch thick at its lower end and a half of an inch thick at the top end which has a
rounded projection across it for the pitman to strike against, it is made
curving about one inch in its whole length, and put on to the lower lever
of the toggle joints so that its top end will be level with the pin in the
middle joint and the bottom end between the lower toggles and a bar
that is placed across the frame for the levers to rest on. that side of
the lever being next to the toggles) which forms the outside of a curve
The lever is kept in its place by 2 thin plates of iron one projecting
out from the toggle each side of the lever. in these projections near to
the bottom end of the lever there are slits in which a pin moves
that is put through the end of the lever. The slits are long enough to
permit the end of the lever to have its proper motion and their outer
ends are one half of an inch lower than the ends next to the toggle
joints ) so that when the bottom end of the lever is thrown out the slits
will cause it to slip downward on the toggle joints, when the pitman
strikes this lever it carries it forward. the lower end remaining on its
bearing which serves for the fulcrum of the lever, and the toggle joints
are forced up gradually the resisting power receding from the fulcrum until
the lever is brought to bear near to its top end when it is carried along with the
toggle joints until the impression is given when the toggle joints return
the lower end of the lever strikes its bearing first and it operates with a
progressive force. in resisting the heft of the bed until it comes to its place
of rest. In order to prevent the machine from giving an impression
in case of necessity there is a bar of iron placed across the frame on the
two lower rails. and under the pitman, with a treadle or lever attached
to each end of it which are hung to the sides of the (Rails) so that the
person at either end of the machine who lays on the paper may press
the end of one of the levers down with the foot which will raise the pit-
man high enough to clear the projection and permit it to pass thro' the
slit in the upper lever of the toggle joints without moving them. The
ink is distributed by a set of rollers on each side of the bed with an ink
fountain to each set. The under composition Rollers are placed so that
their centres will be 1 1/2 inches from the edges of the bed & 3/4 below its upper side, a wooden Roller six inches shorter than the composition Rollers
is then placed against each of the bottom Rollers on the sides next to the bed.
which serve to equalize the ink by a reciprocating movement of six inches
inclusive. Two other composition Rollers of the same length of the bottom
ones, are then placed on each of the bottom Rollers, so that their top side
will be level with the type on the bed when it is in its lowest situation.
These composition Rollers are supported by pivots in their ends which run
in boxes fastened to the inside of the frame. The fountains are iron troughs
which have an iron Roller lying lengthwise in the middle of each of them.
The Rollers are placed so that the top sides of them are one half of an
inch higher ~~than~~ the sides of the troughs. In order to guage the quan-
tity of ink drawn out of the fountains on the Rollers, there is a scraper
to each fountain, made of a thin plate of iron and fastened with screws
to one side of the trough, one edge of which is well fitted to the side of
the roller. The holes which the screws are put through, to hold the scra-
pers on to the sides of the troughs, are made a little oblong crosswise
so that the scrapers may be moved nearer to or farther from the rollers
in order to let out more or less ink. The fountains are placed on a
sliding frame near to, and parallel with the bottom composition Rollers.
The fountain Rollers being level with the underside of the composition
Rollers. The frame which supports the fountains is formed of 4 bars, 2
of which run across the Press frame and are supported at their ends by
ledges secured to the top rails. The other 2 bars pass under the bed length-
wise of the frame and connect the 2 formers to each other. A reciprocating
movement is given to this frame and consequently to the fountains by
means of an eccentric groove formed in the top side of a horizontal plate
of iron on the shaft of the crank which operates on a projection on the
under side of the flat Rod that is attached to the frame and held steady
in a box fastened to the underside of the middle cross bar. The groove is so
formed that it moves the fountains one inch in going one twelfth of its
revolution where it permits them to stand still untill it has passed 5 twelfths
more of its revolution, when the fountains are drawn back in the same time
they were moved forward. The fountain Rollers are moved by palls which are attached to the side of the top Rails and operate on ratchet wheels on the ends of the rollers. so that they are turned a little every reciprocation of the frame and fountains. The ink is taken from the fountains and communicated to the composition Rollers by small wooden Rollers which lie on the top of the fountain Rollers where they are held by pivots in their ends which run in holes made in the ends of the springs that are fastened to the sliding frame and run up in a curved form over the fountains. When either of the fountains are moved towards the distributing Rollers the small wooden Roller is raised clear from the fountain roller by means of studs projecting out from the sides of the top rails, and under the springs so that when the fountains are moved. the springs slide up on the studs and raise the roller which is at the same time carried against the composition roller where it leaves a portion of the ink. the reciprocating Rollers are attached to two bars, the ends of which slide in boxes attached to the under edges of the top rails, These bars are connected to each other by 2 other bars. one of which runs lengthwise of the machine on each side of the toggle joints The reciprocating movement is given to these rollers by means of a lever one end of which is hung to the under side and in the middle of one of the connecting bars last above named. The other end of the lever has a projection on it which runs in a groove in the form of a heart made round the shaft of the crank. in the top side of the before named horizontal plate. There are still 2 other composition Rollers which distribute the ink over the type by being moved over the bed from one sett of Rollers to the other, from which they receive a sufficient quantity of ink for every impression. These Rollers are hung in the middle of a frame 5 feet long which runs in rabbits made in the inside corners of the top edges. of the top Rails of the machine. This frame is made of 2 side pieces 1½ inch square and 2 end pieces 1/2 inch thick and 3 wide; and it is kept from rising out of its place by thin plates of iron screwed on to the top rails so as to project a little over its side pieces. The Rollers are hung by pivots in their ends which run in boxes fastened to the side pieces with screws. the holes which the screws are put thro are made oblong perpendicularly so that the Rollers may be adjusted to the type by raising or lowering the bearings. There are 2 friskets hung on this frame one on each
side of the Rollers, so that when the Rollers are on one side of the bed
one of the friskets will be under the Platten and when they are carried
over the type to the other side that frisket is carried out, and the other
one drawn in, one edge of the friskets is hung by pivots which are let into
the top of the side pieces near to the end pieces, and are kept in their
places by buttons, over the pivots. The other edges of the friskets are sup
ported by a prong at each corner which rests on the pieces forming the
bearings for the Rollers. It is found by experiment that the sheet
would sometimes break at the point holes on account of its being left
loose on the frisket before it was clear from the type; in order to prevent
this I have put springs on the under sides of the friskets which keep them
up snug to the Platten until the sheet is entirely clear from the type which
effectually prevents the sheet from breaking} The edges of the friskets next
to the rollers are about 2 inches lower than the outer edges which is to prevent
the air from throwing the sheet from the points when it is moved in quick. The
friskets with the Rollers and frame to which they are hung are operated by
a crank motion on the end of a shaft which stands on the end of
the shaft of the crank that gives the impression. the top end of which
forms a step for the lower end of the short shaft. In order to give a
periodical motion to this shaft an iron bar 18 inches long 3 inches
wide and one inch thick is put thro it, near to its lower end, and hung
at its centre on a pin which is put thro the shaft.
The top end of the lower crank shaft has an arm on it with a projection
on its upper side which strikes the bar near ^at^ one end and carries it around
one half of a revolution which moves the rollers over the bed by means
of the crank and pitman on its top end. That end of the bar is then
raised by an inclined plane, on the middle cross bar of that end of the
frame so as to clear the projection on the arm. The friskets with the
rollers and frame then stop untill the impression ^is given^ when the arm strikes
the other end of the bar and carries the rollers over the form again, and
so on in rotation. When I first projected this machine, I calculated to
put the paper directly on to the friskets but I found in that case there would be a loss of nearly one half of the time in putting on the sheets; to prevent this loss of time I have made 2 fly frames which correspond in size to the friskets and covered them with a coarse net work one of which is hung at each end of the machine on pivots, so that when either of the friskets are out one of the frames may be turned down on to it where it leaves the sheet previously pointed on the fly frame. These frames are made with 2 cross bars, one passing across the middle of the frame each way. At proper distances from the edges of the frame for the points there are apertures or nicks cut in these bars which receive small slides 3 inches long with points on them. the slides are made in a dovetail form so that by turning screws in against them, from the back sides of the frames they may be kept in their places. there are also other points on rods which are fastened to the friskets with screws. The holes which the screws go through being made oblong crosswise of the rods so that the points on the friskets may be adjusted in a line with the points on the frames. The fly frames are operated by means of a cog wheel on that pivot of each frame which is on the opposite side from where the persons stand to put on the paper. Each of these wheels is operated by 2 segments of different sized cog wheels, which are connected together the smallest ones of which geer into racks fastened to slide rails which run along the sides of the machine and are connected to each other by 2 cross bars. one of which is near to the crank, and the other near to the other end of the machine. The edge of the bar next the crank is so formed that a friction roller, which is attached to the crank just above the pitman, shall strike it, and move the slide rails far enough to turn down the fly frames and so that they may be drawn back by a weight as the friction roller moves along on the edge of the cross bar. The weight is attached to the cross bar which connects the other ends of the slide rails. here it must be observed that if the large segment, geered directly into the cog wheel on the fly frame at the opposite end of the machine from the crank it would turn it the wrong way. Therefore an intermediate wheel is put on to the top rail so as to gear into the wheel on the fly frame, and the large segment. In order to prevent both of the fication are not to be considered a rule in all cases but the machine must
be proportioned to the work that is to be done with it.
The above is, a Plain Specification of the whole machine, and those parts
which I claim as my invention are designated as follows Viz. The com
bination of Stationary fly frames, with Points for getting Register by, on
them with Printing Presses. The object of these fly frames is to enable
the person who lays on the paper, to point one Sheet while the sheet
previously put on, is receiving the impression and by that means save
the time which would be lost in waiting for the frisket to come out.
Furthermore I claim the apparatus described in the foregoing Specification
for giving a Periodical movement to the rollers & friskets. that is I do
not claim the parts separately but merely that combination of parts
to produce the effect as set forth in the Specification. And furthermore
I claim as my invention the application of the declution Lever set
forth and described in the foregoing Specification. In testimony that
the above is a true Specification of my said improvements as above
described I have here to set my hand and seal the 14th day of April
in the year of Christ one Thousand Eight hundred and thirty Exd Witnesses
W.J.E. Augustus Peabody }
John Bryant Jr }

Isaac Adams

[illegible] 200

(4710 words)

(Granted October 4. 1830)